US007490152B2

(12) United States Patent
Lauer

(10) Patent No.: US 7,490,152 B2
(45) Date of Patent: Feb. 10, 2009

(54) VERSION CACHING MECHANISM

(75) Inventor: Bryan A. Lauer, Hinckley, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 978 days.

(21) Appl. No.: 10/412,006

(22) Filed: Apr. 11, 2003

(65) Prior Publication Data
US 2004/0215794 A1   Oct. 28, 2004

(51) Int. Cl.
G06F 15/173 (2006.01)
G06F 15/16 (2006.01)
(52) U.S. Cl. .............. 709/225; 709/223; 709/224; 709/226; 709/227; 709/228; 709/229; 709/230
(58) Field of Classification Search ............ 709/225, 709/224, 223, 226, 227, 228, 229, 230
See application file for complete search history.

(56) References Cited
U.S. PATENT DOCUMENTS

| 6,564,261 | B1* | 5/2003 | Gudjonsson et al. | 709/227 |
| 6,721,290 | B1* | 4/2004 | Kondylis et al. | 370/329 |
| 7,356,567 | B2* | 4/2008 | Odell et al. | 709/206 |
| 7,366,897 | B2* | 4/2008 | Noble | 713/156 |
| 2002/0032736 | A1* | 3/2002 | Idehara | 709/206 |
| 2002/0082033 | A1* | 6/2002 | Lohtia et al. | 455/517 |
| 2003/0081607 | A1* | 5/2003 | Kavanagh | 370/392 |
| 2003/0153296 | A1* | 8/2003 | Mueller | 455/403 |
| 2004/0215794 | A1* | 10/2004 | Lauer | 709/230 |
| 2006/0136590 | A1* | 6/2006 | Barrett et al. | 709/225 |

OTHER PUBLICATIONS

Global System for Mobile Communication Technical Specification, 3GPP TS 23.060 V5.2.0 (2002) p. 1-199.*
Global System for Mobile Communications, Technical Specification, ETSI TS 100 975 V7.0.0 (1999), pp. 1-19.
Global System for Mobile Communications, Technical Specification, 3GPP TS 23.060 V3.13.0 (2002), pp. 1-193.
Global System for Mobile Communications, Technical Specification, 3GPP TS 29.060 V3.14.0 (2002), pp. 1-90.

* cited by examiner

Primary Examiner—John Follansbee
Assistant Examiner—Karen C Tang

(57) ABSTRACT

A protocol identifier, such as, a GTP version identifier, is automatically cached in association with device contact information. Setup latency is reduced for subsequent connections. For instance, the cache indicates that a GGSN only supports $GTPV_0$. An SGSN attempts to create a PDP context with the GGSN using $GTPV_0$ without first trying $GTPV_1$. If the cache does not include a version identifier for an APN IP address, the SGSN tries to create a context with a first version (e.g., $GTPV_1$) and, if necessary, a second version (e.g., $GTPV_0$). An identifier associated with the successful protocol is stored in the cache in association with the contact information (e.g., APN or APN IP address). Freshness of cached information is assured. For example, when all tunnels associated with an APN IP address are torn down, a flush timer is started. If the timer expires, the cache entry is removed.

27 Claims, 6 Drawing Sheets

VERSION CACHING MECHANISM

BACKGROUND

The invention is related to the art of network interworking. The invention may find application wherever a network can include elements that communicate via different protocols. The invention will be explained in terms of different versions of a General Packet Radio Service (GPRS) tunneling protocol (GTP). However, the invention may find application wherever a first device can benefit from information regarding a protocol used by a second device.

There are currently two versions of the GPRS tunneling protocol (GTP). The two versions are known as $GTP_{V0}$ and $GTP_{V1}$. The tunneling protocols are not completely compatible. Therefore, procedures have been specified that allow a first network device or platform that supports one version to communicate with another device or platform that supports the other version. However, in order to interoperate with the second device or platform, the first platform must determine which version is supported by the second device. In order to make this determination, the 3rd Generation Partnership Project (3GPP in its technical specification 29.060) suggests that the first platform attempt to communicate with the second platform using the latest version (e.g., $GTP_{V1}$). If that attempt fails, for example, due to an unreliable (i.e.; unacknowledged) nature of a transport protocol (e.g. UDP), the specification recommends trying to communicate with the second device using an older version (e.g., $GTP_{V0}$). This procedure can introduce delays in a call setup procedure.

For example, each attempt to communicate is associated with a wait or response time. Each wait or response time can be on the order of 5 or 10 seconds. Generally, each attempt would be associated with several retries (e.g., 3). Therefore, GTP tunnel setup times of nearly a minute might not be uncommon.

The 3GPP specification (29.060) allows for GTP version caching. However, the specification does not specify or suggest a method for caching GTP versions.

One method of keeping track of the GTP versions supported by each platform in a network is to have a database manually updated each time a platform is added to the network and each time a network component is upgraded. However, such a method is time consuming, expensive, and prone to error.

Therefore, there is a desire for a method of automatically caching protocol versions so that tunnels can be set up without first making several attempts to set up a tunnel to a remote platform using an incompatible version or protocol.

SUMMARY

A method for caching a supported protocol of a remote device includes receiving a first request to establish a connection with the device, the request being associated with contact information related to the device. For example, the contact information can be included in the request or can be determined from information in the request, such as, for example an identification associated with the requestor. The method further includes using the contact information as a key or index into a protocol cache, attempting to establish the connection with the device using a protocol associated with a previously stored protocol identifier if the previously stored protocol identifier is stored in association with the contact information, attempting to establish the connection with the device with a first protocol if the previously stored protocol identifier is not stored in association with the contact information, storing a first protocol identifier in a protocol cache in association with the contact information if the attempt to establish the connection with the device with the first protocol was successful, attempting to establish a connection with the device with a second protocol if the attempt to establish the connection with the device with the first protocol was not successful, and, storing a second protocol identifier in the protocol cache in association with the contact information if the attempt to establish the connection with the device with the second protocol was successful and the attempt to establish the connection with the device with the first protocol was not successful.

The method can further include removing the association of the previously stored, first or second protocol identifier with the contact information upon the expiration of a flush timer. The flush timer can be started when all connections associated with the contact information between the system having the cache and the remote device are torn down. Alternatively, or additionally the association of the previously stored identifier with the contact information can be removed if the attempt to establish communication with the device using a protocol associated with the previously stored protocol identifier is unsuccessful.

In a GTP environment, receiving a request to establish communication with the device can include receiving an Activate PDP Context Request message. The Activate PDP Context Request message is associated with information identifying a requester. The information identifying the requestor associates the Activate PDP Context Request message with contact information because the information identifying the requestor can be used to access a database and retrieve the contact information or information useful in determining the contact information. For example, the database can be a Home Location Register (HLR).

Alternatively, the Activate PDP Context Request message includes contact information directly. For example, the contact information is an Access Point Name (APN) (logical name) and storing the first or second protocol identifier in the protocol cache in association with the contact information includes storing a first or second GTP version identifier in a GTP version cache in association with an APN. In yet a further alternative, the first or second GTP version identifier is stored in the GTP version cache in association with an APN IP address. For example, the APN can be resolved into an APN IP address with locally stored information or via the services of a Domain Name Server (DNS).

Some embodiments include a method for caching a GTP version of a GPRS support node including receiving a GTP tunnel setup request message associated with an APN or APN IP address. As explained above, the association can be direct or indirect. The method further includes determining if a previously stored GTP version entry associated with the APN or APN IP address exists in a GTP version cache table.

If a previously stored GTP version entry does not exist, the method includes attempting to establish a connection with the GPRS support node with a first version (e.g. the most recently released version) of GTP, determining if the attempt to establish a connection with the GPRS support node with a first version of GTP was successful, and if the attempt to establish a connection with the GPRS support node with a first version of GTP was successful, storing a first GTP version identifier in the GTP version cache table in association with the APN or APN IP address.

If the attempt to establish a connection with the GPRS support node with the first version of GTP was not successful, The method includes attempting to establish a connection with the GPRS support node with a second version of GTP, and determining if the attempt to establish a connection with the GPRS support node with the second version of GTP was successful.

If the attempt to establish a connection with the GPRS support node with a second version of GTP was successful, the method includes storing a second GTP version identifier in the GTP version cache table in association with the APN or APN IP address.

The method can further include monitoring a status of connections or tunnels associated with the APN or APN IP address, starting a timer when all monitored tunnels associated with the APN or APN IP address are torn down and, when the timer expires, flushing the previously stored, first or second GTP version identifier cache entry associated with the APN or APN IP address.

The method can further include removing the timer if a new tunnel is set up in association with the APN or APN IP address before the timer expires.

Receiving a first GTP tunnel setup request message can include receiving a GTP Activate PDP Context Request message associated with a APN and resolving the APN into an APN IP address.

Monitoring the status of tunnels associated with the APN or APN IP address can include incrementing a counter associated with the APN or APN IP address each time a PDP context is set up in association with the APN or APN IP address and decrementing the counter associated with the APN or APN IP address each time a PDP context associated with the APN or APN IP is torn down.

Starting the timer when all monitored tunnels associated with the APN or APN IP address are torn down can include starting the timer when the counter associated with the APN or APN IP address has a zero value.

Some embodiments include flushing the previously stored GTP version entry associated with the APN or APN IP address if the attempt to establish a connection with the GPRS support node with the version of GTP associated with the previously stored GTP version was not successful. In some of those embodiments the method includes attempting to establish the connection with the GPRS support node with the first version of GTP, determining if the attempt to establish the connection with the GPRS support node with the first version of GTP was successful and if the attempt to establish the connection with the GPRS support node with the first version of GTP was successful, storing a first GTP version identifier in the GTP version cache table in association with the APN or APN IP address.

If the attempt to establish a connection with the GPRS support node with the first version of GTP was not successful these embodiments include attempting to establish the connection with the GPRS support node with a second version of GTP, determining if the attempt to establish a connection with the GPRS support node with the second version of GTP was successful, and, if the attempt to establish a connection with the GPRS support node with a second version of GTP was successful, storing a second GTP version identifier in the GTP version cache table in association with the APN or APN IP address.

For example, the first version of GTP can be $GTP_{V1}$ and the second version of GTP can be $GTP_{V0}$.

As suggested above, the invention can be implemented within a Serving GPRS support node (SGSN). Such an SGSN might include a GTP version cache including a plurality of GTP version identifiers in association with a respective plurality of APNs or APN IP addresses and a respective plurality of context counts. Additionally, the SGSN might include means for receiving a GTP tunnel setup request message associated with an APN or APN IP address, means for attempting to establish a connection with the GPRS support node with a version of GTP associated with the previously stored GTP version identifier, means for incrementing a context count when a context is successfully set up using an APN or APN IP address and a GTP version associated with a GTP version identifier stored in the GTP version cache in association with the APN or APN IP address, and, means for decrementing the context count when the context associated with the APN or APN IP address and the GTP version associated with the GTP version identifier stored in the GTP version cache in association with the APN or APN IP address is torn down.

Some embodiments of such an SGSN include means for updating a respective timer value according to a passage of time, means for starting the means for updating the respective timer value when a respective context count has a zero value, and, means for removing an association between a respective GTP version identifier and a respective APN or APN IP address when the respective timer value reaches a predetermined value.

Some of these embodiments include means for stopping the means for updating the respective timer value before the respective timer value reaches the predetermined value if the respective context count is incremented above the zero value.

Some embodiments include means for removing an association between a respective GTP version identifier and a respective APN or APN IP address if an attempt to establish a connection with the GPRS support node with a version of GTP associated with the respective GTP version identifier fails.

Some embodiments include means for attempting to establish a connection with the GPRS support node with a trial version of GTP, means for storing a trial GTP version identifier in the GTP version cache in association with the APN or APN IP address if the attempt to establish the connection with the GPRS support node with the trial version of GTP is successful. For example, the trial version of GTP can be $GTP_{V1}$, $GTP_{V0}$ or some other version (i.e., $GTP_{Vn}$).

The means for functions discussed above can take the form of networking and/or computer hardware and/or software, configured and/or programmed to perform the described functions.

BRIEF DESCRIPTION OF THE DRAWINGS

The invention may take form in various components and arrangements of components, and in various procedures and arrangements of procedures. The drawings are only for purposes of illustrating preferred embodiments, they are not to scale, and are not to be construed as limiting the invention.

DETAILED DESCRIPTION

Figure 1:
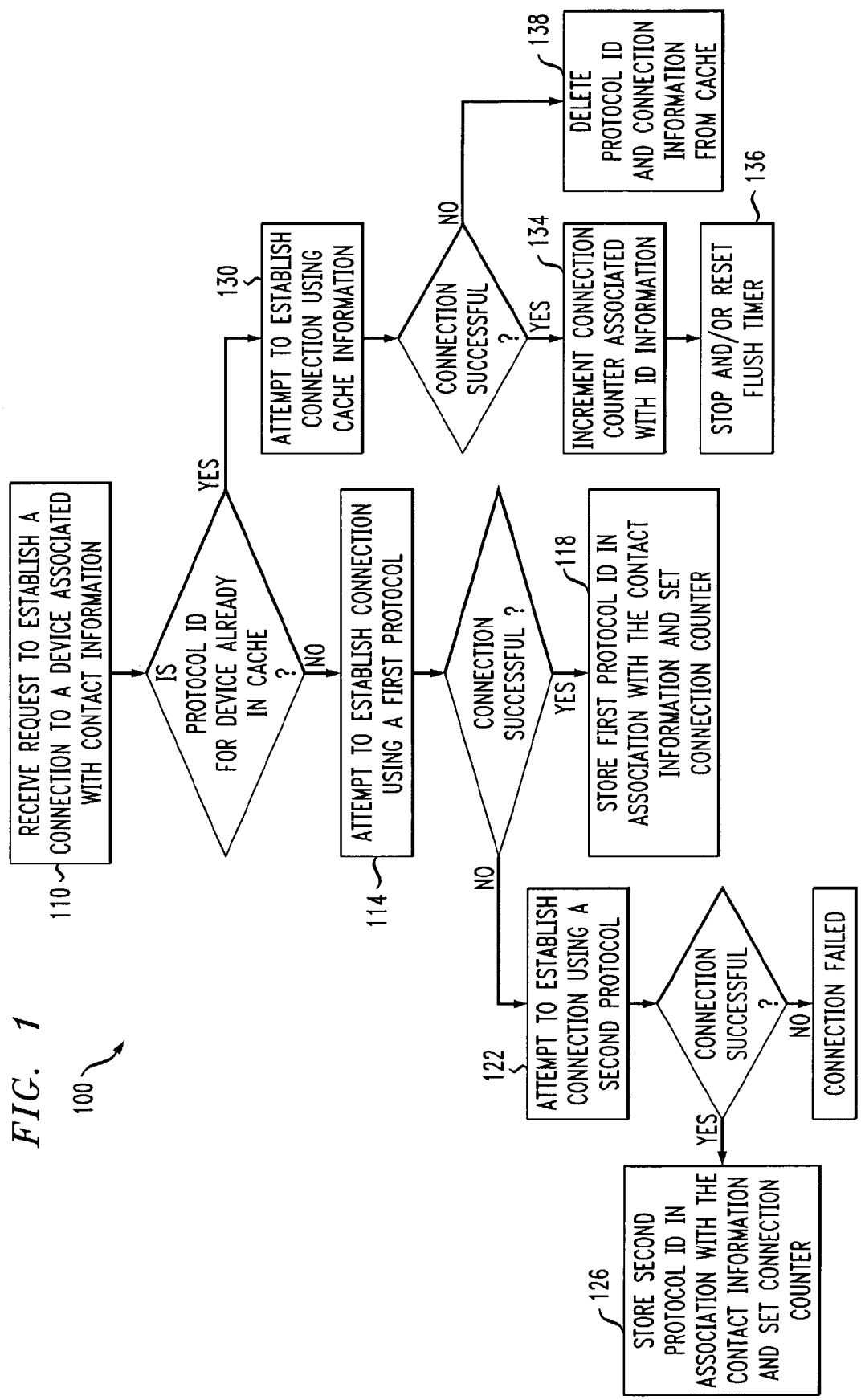
FIG. 1 is a flow chart outlining a method for caching a protocol version associated with a device.

Referring to FIG. 1, a method 100 for caching a supported protocol of a remote device or platform includes receiving 110 a first request to establish a connection with the remote device, the request being associated with contact information associated with the remote device. The method 100 further includes attempting 114 to establish the connection using a first protocol and storing 118 a first protocol identifier in a protocol cache in association with the contact information if the attempt to establish the connection with the device with the first protocol is successful. The method 100 can further include attempting 122 to establish the connection with the remote device using a second protocol and storing 126 a second protocol identifier in association with the contact information if the attempt 122 to establish the connection with the second protocol was successful. Storing 118 the first protocol identifier or storing 126 the second protocol identifier can further include setting a connection counter in association with the stored protocol identifier to an initial value, such as, for example, one. The connection counter may be used to keep track of a number of connections currently established using a protocol associated with the stored protocol identifier and contact information.

If, when the request to establish a connection to the device associated with the contact information is received 110, there is already a protocol identifier stored in the cache in association with the contact information, an attempt 130 can be made to establish the connection using the cached information. If the attempt to make the connection is successful, the connection counter associated with the protocol identifier and contact information is incremented 134.

Additionally, if a flush timer (which is explained in greater detail below) is running in association with the contact and/or protocol identifier information, the flush timer is stopped, removed and/or reset 136.

If the attempt 130 to establish a connection is unsuccessful, the protocol identifier and connection information may be deleted 138 from the cache. Alternatively, or additionally, there may be an attempt 114, 122 to establish a connection using the first protocol or the second protocol.

The deletion 138 of apparently incorrect protocol identifier information is one means of keeping the information in the cache fresh or assuring that the information is not stale. The flush timer mentioned above is another means for preventing the information in the cache from becoming stale.

Figure 2:
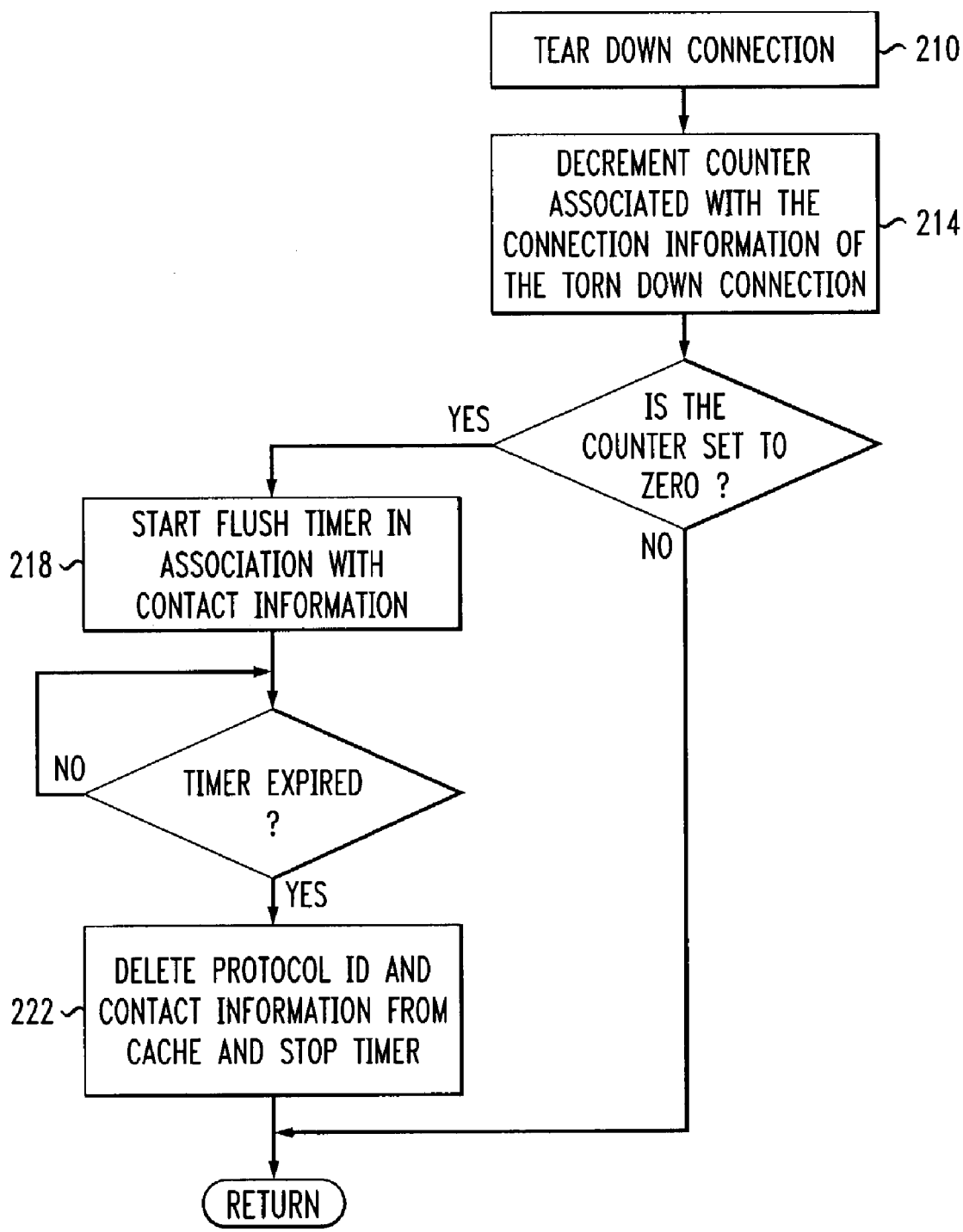
FIG. 2 is a flow chart outlining a method for monitoring connections or tunnels associated with a cache and flushing a cache entry at an appropriate time.

Referring to FIG. 2, when an established connection is torn down 210, the method 100 for caching a supported protocol of a device may further include decrementing 214 the connection counter value associated with the connection information of the torn down connection. If the counter value is zero, indicating that no more connections based on the associated contact and protocol identifier information are currently established, the flush timer is started 218. The timer may be pre-configured to expire immediately, after a few minutes, or after many hours or days. When the timer expires, the protocol identifier and/or contact information stored in the cache may be deleted 222.

If, after such a deletion, a new request is received 110 to establish a connection to the device using the contact information, a protocol identifier entry associated with the contact information will not be found, and a new attempt 114 will be made to establish the connection using the first protocol. If that attempt fails, an attempt 122 will be made to establish the connection using the second protocol. A protocol identifier associated with the successful protocol (i.e; the first or second protocol) will be stored 118, 126 in association with the contact information.

The flush timer may be used in addition to or instead of the deletion 138 of protocol and connection information based on unsuccessful connection attempts. Deleting 138 the protocol identifier and/or connection information from the cache based on unsuccessful connection attempts may be premature. For example, a connection attempt may be unsuccessful because of network failures and not because cached protocol identifier information is stale.

Figure 3:
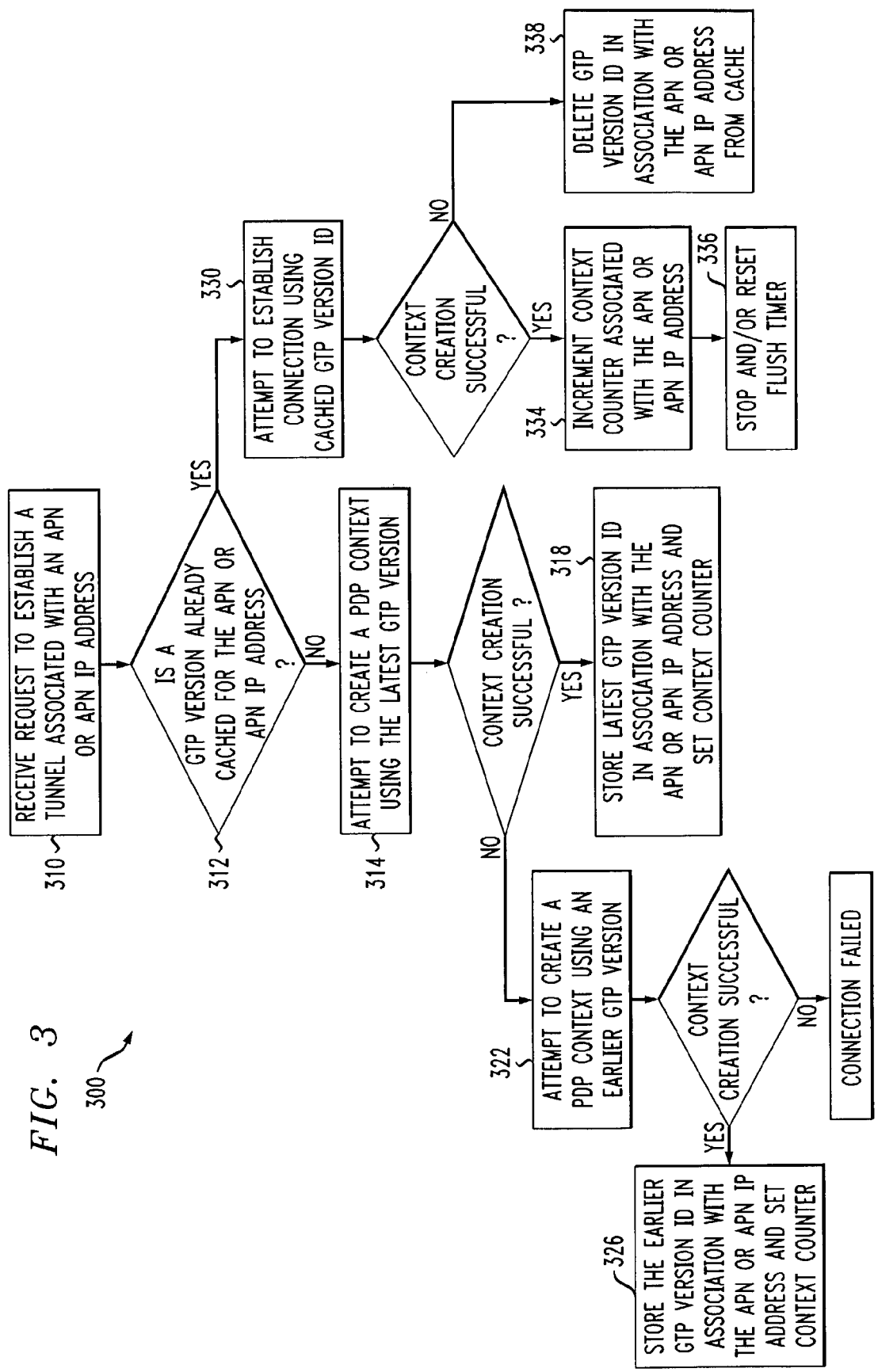
FIG. 3 is a flow chart outlining an embodiment of the method of FIG. 1 directed toward GTP version caching.

Referring to FIG. 3, some embodiments of the method 100 for caching a supported protocol include a method 300 for caching a GTP version of a network platform. For instance, the network platform can be a GPRS support node. For example, the GPRS support node can be a serving GPRS support node (SGSN) or a gateway GPRS support note (GGSN). The method 300 for caching a GTP version includes receiving 310 a request to establish a tunnel associated with an Access Point Name (APN) or APN IP address and determining 312 if a GTP version identifier is already cached for the APN or APN IP address. If GTP version information is not already cached for the APN (logical name) or APN IP address, the method 300 for caching a GTP version includes attempting 314 to create a Packet Data Protocol (PDP) context using a first GTP version. For example, the first GTP version is the latest available GTP version (e.g. $GTP_{v1}$). If the attempt 314 is successful, a first GTP version identifier is stored 318 in association with the APN or APN IP address and a connection or context counter is set equal to 1. If the context is not successfully created using the first GTP version, an attempt 322 to create a PDP context using a second GTP version, for example, an earlier GTP version (e.g. $GTP_{v0}$), is made. If this attempt 322 to create a context is successful, a second or earlier GTP version identifier is stored in association with the APN or APN IP address and a connection or context counter associated with the APN IP address is established with a value set to 1.

If the determination 312 is made that a GTP version identifier is already cached in association with the APN or APN IP address, then an attempt 330 to establish a PDP context using the cached GTP version is made. If the attempt 330 to establish PDP context using a version of GTP associated with the cached version identifier is successful, the context counter associated with the APN IP address may be incremented 334. Additionally, any flush timer that might be running in association with the cached APN IP address and GTP version may be stopped, removed and/or reset 336.

If the attempt 330 to establish a context is not successful, the cached version identifier associated with the APN or APN IP address may be removed 338 from the cache. Additionally, or alternatively, the freshness of cached GTP version information may be maintained through the use of a flush timer as was explained in reference to FIG. 2.

As mentioned above, the method 300 for caching a GTP version may be implemented in a GPRS service node (GSN). For example, the method 300 for caching a GTP version can be implemented by a Serving GPRS Service Node (SGSN).

Figure 4:
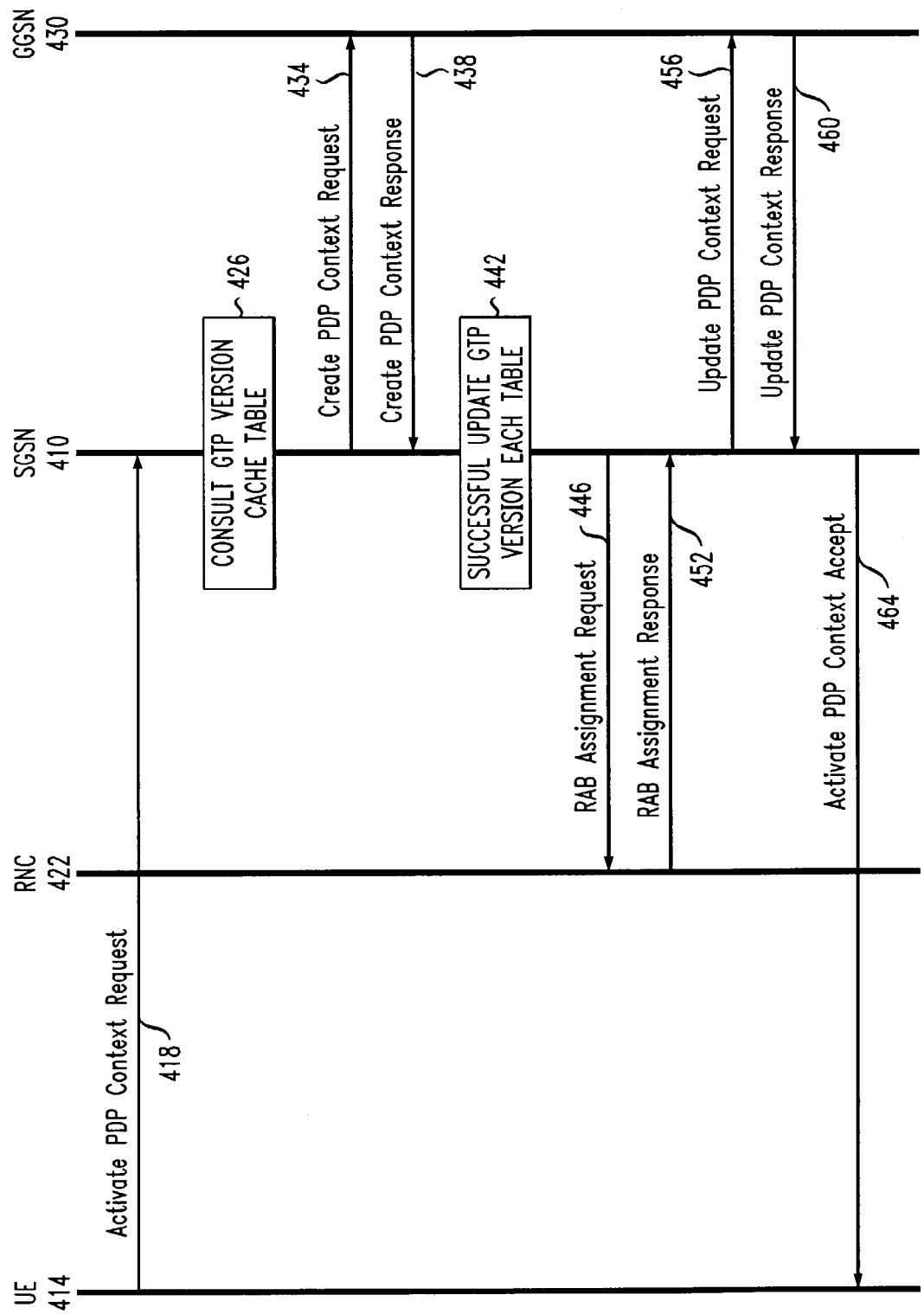
FIG. 4 is a call flow diagram summarizing a first call scenario associated with the method of FIG. 3.

Referring to FIG. 4, an exemplary SGSN 410 includes an embodiment of the method 300 for caching a GTP version. For example, the method 300 is implemented in software or hardware or a combination thereof installed within the SGSN 410. A piece of user equipment 414 such as, for example, a laptop computer, Personal Digital Assistant, or cell phone, requests that a tunnel be set up. For example, the user equipment 414 sends an Activate PDP Context Request 418 to the SGSN 410 through the services of a Radio Network Controller (RNC) 422. The Activate PDP Context Request may or may not specify an APN. If the APN is not specified, the SGSN retrieves the APN within a database such as, for example, a Home Location Register (HLR). When the APN is determined, the SGSN may resolve the APN's logical name into an IP address using locally stored information. Alternatively, the SGSN may resolve the APN into an APN IP address using a Domain Name Server (DNS). In the end, an APN (logical name) is associated with a APN IP address and used for the associated Activate PDP Context Request. The SGSN accesses 426 a GTP version cache table to determine 312 if a GTP version identifier is already cached for the APN or APN IP address associated with the activate PDP context request 418. In this exemplary scenario, a GTP version is cached in the cache table, and so an attempt 330 is made to establish a PDP context. For example, the APN or APN IP address is associated with a GGSN 430. The SGSN 410 sends a Create PDP Context Request message 434 to the GGSN 430 using a version of GTP associated with the cache GTP version identifier. The cached version identifier is correct, and the GGSN replies to the Create PDP Context Request 434 with a Create PDP Response 438 message. For instance, the Create PDP Context Response 438 includes a cause parameter or attribute set to "Request Accepted." Therefore, the attempt 330 to establish a PDP context is successful and the SGSN updates 442 the GTP version cache table by incrementing 334 a context counter associated with the APN or APN IP address.

From this point, call processing proceeds as is known in the art. For example, the SGSN 410 sends the RNC 422 a Radio Access Bearer (RAB) assignment request. The RNC 422 replies with an RAB assignment response 452. The SGSN 410, if needed, sends the GGSN 430 an Update PDP Context Request message 456 and the GGSN 430 replies with an Update PDP Context Response message 460 and the SGSN 410 sends the user equipment 414 an Activate PDP Context Accept message 464.

Figure 5:
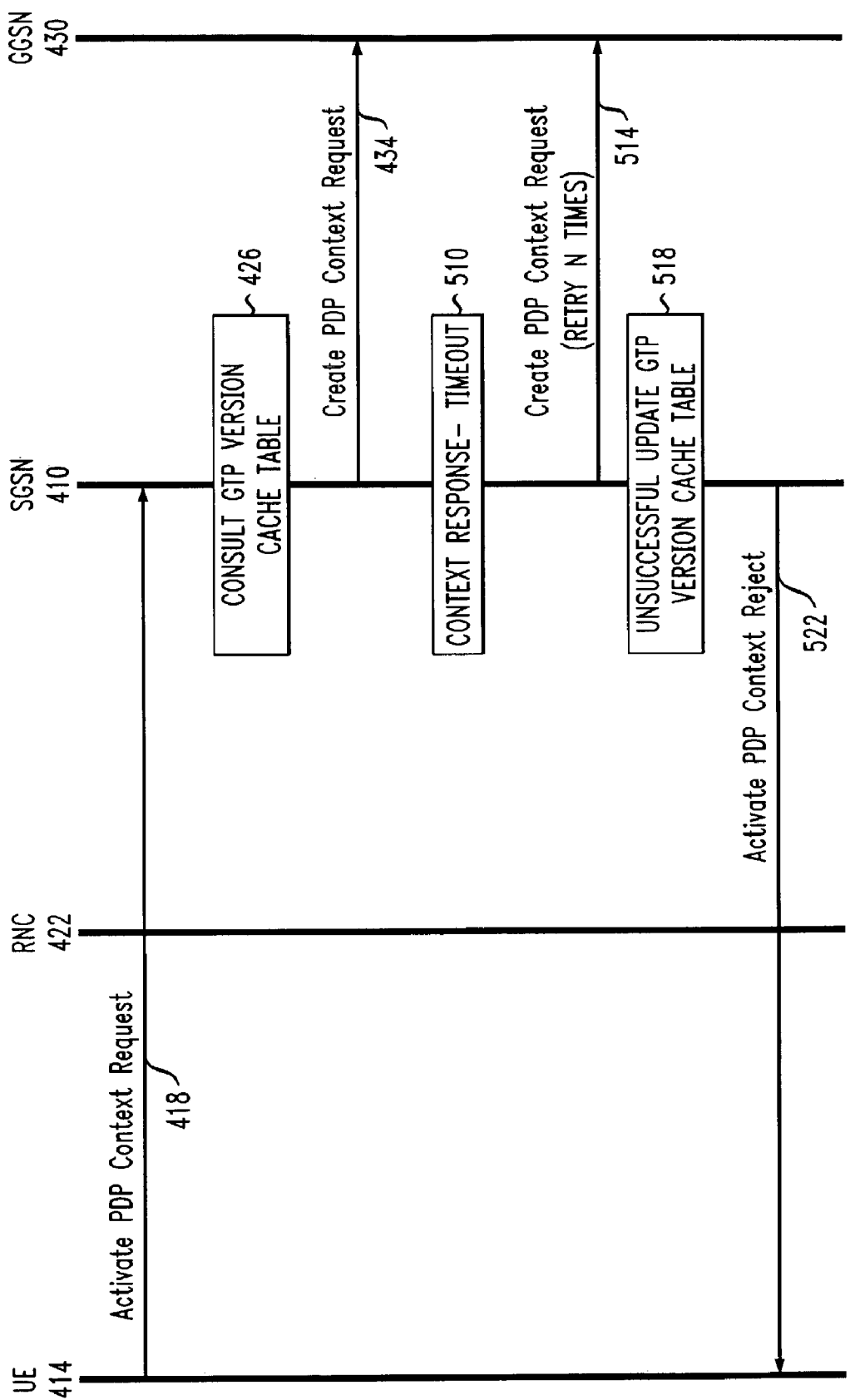
FIG. 5 is a call flow diagram summarizing a second call scenario associated with the method of FIG. 3.

Referring to FIG. 5, in a second exemplary scenario, the Activate PDP Context Request 418 from the user equipment 414 is received by the SGSN 410 and the GTP version cache table is queried or accessed 426 as described in reference to FIG. 4. An entry is found in reference to the APN or APN IP address and a Create Context Request message 434 is sent to the GGSN 430 using that the GTP version associated with the previously stored GTP version identifier. However, the GGSN does not reply to the Create PDP Context Request 434. Instead, a context request time out 510 occurs in the SGSN. In response to the context response time out 510, the SGSN 410 performs a retry by sending another Create PDP Context Request 514. Again, the GGSN 430 does not respond, and another context response time out (not shown) occurs. Ultimately, when a predetermined number (N) of time outs and retries occur, a determination is made that the attempt 330 at context creation is unsuccessful and the SGSN 410 updates 518 the GTP version cache table by deleting 338 the GTP version identifier entry that was found during the query or access 426. From this point, call processing proceeds as is known in the art. For example, the SGSN sends an Activate PDP Context Reject message 522 to the user equipment 414.

As pointed out above, in some embodiments, the SGSN would not update 518 the GTP version cache table. Instead, as illustrated in FIG. 2, the SGSN 410 might allow the GTP version ID information in association with the APN or APN IP address to be deleted 222 when an associated flush timer expires. In other embodiments an attempt might be made to create the context using another GTP version. If successful, a GTP identifier associated with the other version might be added to the cache in association with the APN or APN IP address.

Figure 6:
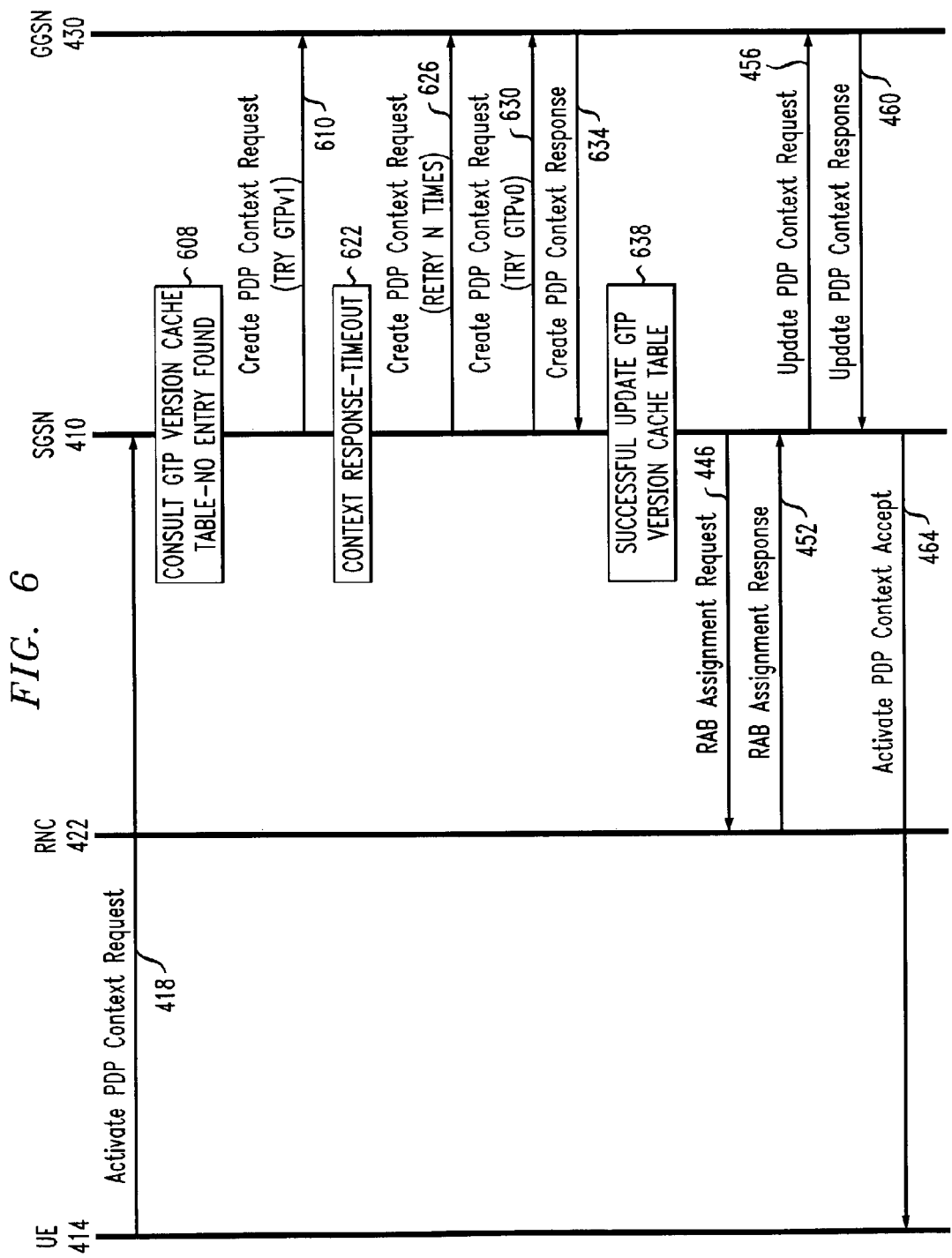
FIG. 6 is a call flow diagram summarizing a third call scenario associated with the method of FIG. 3.

Referring to FIG. 6, in a third exemplary scenario, when the SGSN receives the Activate PDP Context Request message 418 from the user equipment 414, the SGSN 410 queries the GTP version cache table and determines 312 (608) that a GTP version is not already cached in association with the APN or APN IP address associated with the Activate PDP Context Request message 418. Therefore, the SGSN 410 attempts 314 to create a PDP context using, for example, $GTP_{v1}$ and transmits a Create PDP Context Request message 610 to the GGSN 430. In this exemplary scenario the GGSN 430 does not respond. Therefore, a context response time out 622 occurs in the SGSN 410. As a result, up to a predetermined number (N) of additional Create PDP Context Requests 626 are sent. Each create PDP context request 626 is associated with a context response time out (not shown). When the N retries have been exhausted, a determination is made that the attempt 314 to create a PDP context using $GTP_{v1}$ has not been successful. Therefore, an attempt 322 to create a PDP context using an earlier GTP version, such as, for example, $GTP_{v0}$, is made. The SGSN sends a Create PDP Context Request 630 using $GTP_{v0}$. The GGSN 430 responds with a Create PDP Context Response message 634. The SGSN 410 updates 638 the GTP version cache table by storing 326 a $GTP_{v0}$ identifier in association with the APN or APN IP address (associated with the Activate PDP Context Request message 418) and setting a context counter value associated with the entry equal to 1.

The invention has been described with reference to particular embodiments. Modifications and alterations will occur to others upon reading and understanding this specification. It is intended that all such modifications and alterations are included insofar as they come within the scope of the appended claims or equivalents thereof.

I claim:

1. A method for caching a supported protocol of a device, the method comprising:
   receiving a first request to establish a connection with the device, the request being associated with contact information related to the device;
   using the contact information as a key or index into a protocol cache;
   if a previously stored protocol identifier is stored in the protocol cache in association with the contact information, attempting to establish the connection with the device using a protocol associated with the previously stored protocol identifier;
   attempting to establish the connection with the device with a first protocol if the previously stored protocol identifier is not stored in the protocol cache in association with the contact information;
   storing a first protocol identifier in the protocol cache in association with the contact information if the attempt to establish the connection with the device with the first protocol was successful;
   attempting to establish the connection with the device with a second protocol if the attempt to establish the connection with the device with the first protocol was not successful; and
   storing a second protocol identifier in the protocol cache in association with the contact information if the attempt to establish the connection with the device with the second protocol was successful and the attempt to establish the connection with the device with the first protocol was not successful.

2. The method for caching a supported protocol of claim 1 further comprising: removing the association of the stored first protocol identifier or second protocol identifier with the contact information upon the expiration of a flush timer.

3. The method for caching a supported protocol of claim 2 further comprising:
starting the flush timer when all connections associated with the contact information between a system having the cache and the device are torn down.

4. The method for caching a supported protocol of claim 1 further comprising: removing the association of the previously stored identifier with the contact information if the attempt to establish communication with the device using the protocol associated with the previously stored protocol identifier is unsuccessful.

5. The method for caching a supported protocol of claim 1 wherein receiving the first request to establish communication with the device comprises:
receiving an Activate Packet Data Protocol (PDP) Context Request message.

6. The method for caching a supported protocol of claim 1 wherein receiving the first request to establish communication with the device, the request being associated with contact information related to the device comprises:
receiving an Activate Packet Data Protocol (PDP) Context Request message, the Activate PDP Context Request message including information identifying a requestor;
accessing a database with the information identifying the requestor; and retrieving the contact information from the database.

7. The method for caching a supported protocol of claim 1 wherein receiving the first request to establish communication with the device, the request being associated with contact information related to the device comprises:
receiving an Activate Packet Data Protocol (PDP) Context Request message, the Activate PDP Context Request message being associated with information identifying a requestor;
accessing a home location register with the information identifying the requestor; and
retrieving the contact information from the home location register or with information supplied by the home location register.

8. The method for caching a supported protocol of claim 1 wherein receiving the first request to establish communication with the device, the request being associated with contact information related to the device comprises:
receiving an Activate Packet Data Protocol (PDP) Context Request message including an APN.

9. The method for caching a supported protocol of claim 1 wherein storing the first protocol identifier or second protocol identifier in the protocol cache in association with the contact information comprises: storing a first General Packet Radio Service Tunneling Protocol (GTP) version identifier or a second General Packet Radio Service Tunneling Protocol (GTP) version identifier in a GTP version cache in association with an Access Point Name (APN) or an Access Point Name Internet Protocol (APN IP) address.

10. A method for caching a General Packet Radio Service Tunneling Protocol (GTP) version of a General Packet Radio Service (GPRS) support node, the method comprising:
receiving a GTP tunnel setup request message associated with an Access Point Name (APN) or an Access Point Name Internet Protocol (APN IP) address; determining if a previously stored GTP version entry associated with the APN or the APN IP address exists in a GTP version cache table;
if the previously stored GTP version entry does not exist: attempting to establish a connection with the GPRS support node with a first version of GTP; determining if the attempt to establish the connection with the GPRS support node with the first version of GTP was successful;
if the attempt to establish the connection with the GPRS support node with the first version of GTP was successful: storing a first GTP version identifier in the GTP version cache table in association with the APN or the APN IP address;
if the attempt to establish the connection with the GPRS support node with the first version of GTP was not successful: attempting to establish the connection with the GPRS support node with a second version of GTP; determining if the attempt to establish the connection with the GPRS support node with the second version of GTP was successful;
and if the attempt to establish the connection with the GPRS support node with the second version of GTP was successful: storing a second GTP version identifier in the GTP version cache table in association with the APN or the APN IP address.

11. The method for caching a GTP version of a GPRS support node of claim 10 further comprising: monitoring a status of tunnels associated with the APN or the APN IP address;
starting a timer when all monitored tunnels associated with the APN or the APN IP address are torn down; and
flushing the stored first GTP version identifier or second GTP version identifier cache entry associated with the APN or the APN IP address when the timer expires.

12. The method for caching a GTP version of a GPRS support node of claim 11 further comprising: removing the timer if a new tunnel is set up in association with the APN or the APN IP address before the timer expires.

13. The method for caching a GTP version of a GPRS support node of claim 10 wherein receiving the first GTP tunnel setup request message comprises: receiving a GTP Activate Packet data Protocol (PDP) Context Request message associated with an APN; and resolving the APN into a resolved APN IP address.

14. The method for caching a GTP version of a GPRS support node of claim 11 wherein monitoring the status of tunnels associated with the APN or the APN IP address comprises:
incrementing a counter associated with the APN or the APN IP address each time a Packet data Protocol (PDP) context is set up in association with the APN or the APN IP address; and decrementing the counter associated with the APN or the APN IP address each time any PDP context associated with the APN or the APN IP address is torn down.

15. The method for caching a GTP version of a GPRS support node of claim 14 wherein starting the timer when all monitored tunnels associated with the APN or the APN IP address are torn down comprises: starting the timer when the counter associated with the APN or the APN IP address has a zero value.

16. The method for caching a GTP version of a GPRS support node of claim 10 further comprising:
attempting to establish the connection with the GPRS support node with the version of GTP associated with the previously stored GTP version entry; and
flushing the previously stored GTP version entry associated with the APN or the APN IP address if the attempt to establish the connection with the GPRS support node with the version of GTP associated with the previously stored GTP version was not successful.

17. The method for caching a GTP version of a GPRS support node of claim 16 further comprising:
attempting to establish the connection with the GPRS support node with the first version of GTP;

determining if the attempt to establish the connection with the GPRS support node with the first version of GTP was successful;

if the attempt to establish the connection with the GPRS support node with the first version of GTP was successful: storing the first GTP version identifier in the GTP version cache table in association with the APN or the APN IP address;

if the attempt to establish the connection with the GPRS support node with the first version of GTP was not successful: attempting to establish the connection with the GPRS support node with the second version of GTP;

determining if the attempt to establish the connection with the GPRS support node with the second version of GTP was successful; and if the attempt to establish the connection with the GPRS support node with the second version of GTP was successful: storing the second GTP version identifier in the GTP version cache table in association with the APN or the APN IP address.

18. The method for caching a GTP version of a GPRS support node of claim 10 wherein attempting to establish the connection with the GPRS support node with the first version of GTP comprises: attempting to establish the connection with the GPRS support node with GTPv1.

19. The method for caching a GTP version of a GPRS support node of claim 10 wherein attempting to establish the connection with the GPRS support node with the second version of GTP comprises: attempting to establish the connection with the GPRS support node with GTPv0.

20. A Serving General Packet Radio Service Support Node (SGSN) comprising:
a General Packet Radio Service Tunneling Protocol (GTP) version cache including a plurality of GTP version identifiers in association with a respective plurality of Access Point Names (APNs) or Access Point Name Internet Protocol (APN IP) addresses and a respective plurality of context counts;
means for receiving a GTP tunnel setup request message associated with an Access Point Names (APN) or an APN IP address;
means for making a first attempt to establish a connection with the General Packet Radio Service (GPRS) support node with a version of GTP associated with a previously stored GTP version identifier;
means for incrementing a context count when a context is successfully set up using the APN or the APN IP address and the GTP version associated with the previously stored GTP version identifier stored in the GTP version cache in association with the APN or the APN IP address; and means for decrementing the context count when the context associated with the APN or the APN IP address and the GTP version associated with the GTP version identifier stored in the GTP version cache in association with the APN or the APN IP address, is torn down.

21. The SGSN of claim 20 wherein the GTP version cache further comprises:
a plurality of respective timer values in association with the respective plurality of APNs or the APN IP addresses and the respective plurality of context counts;
means for updating a respective timer value according to a passage of time;
means for starting the means for updating the respective timer value when a respective context count has a zero value; and, means for removing an association between a respective GTP version identifier and a respective APN or APN IP address when the respective timer value reaches a predetermined value.

22. The SGSN of claim 20 further comprising: means for stopping the means for updating the respective time value before the respective time value reaches the predetermined value if the respected context count is incremented above zero value.

23. The SGSN of claim 20 further comprising: means for removing the association between the respective GTP version identifier and the respective APN or the APN IP address if the attempt to establish the connection with the GPRS support node with the version of GTP associated with the respective GTP version identifier fails.

24. The SGSN of claim 20 further comprising: means for attempting to establish the connection with the GPRS support node with a trial version of GTP; and means for storing a trial GTP version identifier in the GTP version cache in association with the APN or the APN IP address if the attempt to establish the connection with the GPRS support node with the trial version of GTP is successful.

25. The SGSN of claim 24 wherein the means for attempting to establish the connection with the GPRS support node with the trial version of GTP comprises: means for attempting to establish the connection with the GPRS support node with GTPv1.

26. The SGSN of claim 24 wherein the means for attempting to establish the connection with the GPRS support node with the trial version of GTP comprises: means for attempting to establish the connection with the GPRS support node with GTPv0.

27. A method for caching a supported protocol of a device, the method comprising:
receiving a first request to establish a connection with the device, the request being associated with contact information related to the device;
using the contact information as a key or index into a protocol cache;
making a first attempt to establish the connection with the device using a protocol associated with a previously stored protocol identifier if the previously stored protocol identifier is stored in the protocol cache in association with the contact information;
attempting to establish the connection with the device with a first protocol if the previously stored protocol identifier is not stored in the protocol cache in association with the contact information;
storing a first protocol identifier in the protocol cache in association with the contact information if the attempt to establish the connection with the device with the first protocol was successful;
attempting to establish the connection with the device with a second protocol if the attempt to establish the connection with the device with the first protocol was not successful; and storing a second protocol identifier in the protocol cache in association with the contact information if the attempt to establish the connection with the device with the second protocol was successful and the attempt to establish the connection with the device with the first protocol was not successful.

* * * * *